June 28, 1966     F. ROBERTSON ETAL     3,257,990
SUPPORT FOR NEWLY CROPPED EARS OF DOGS
Filed Oct. 5, 1964
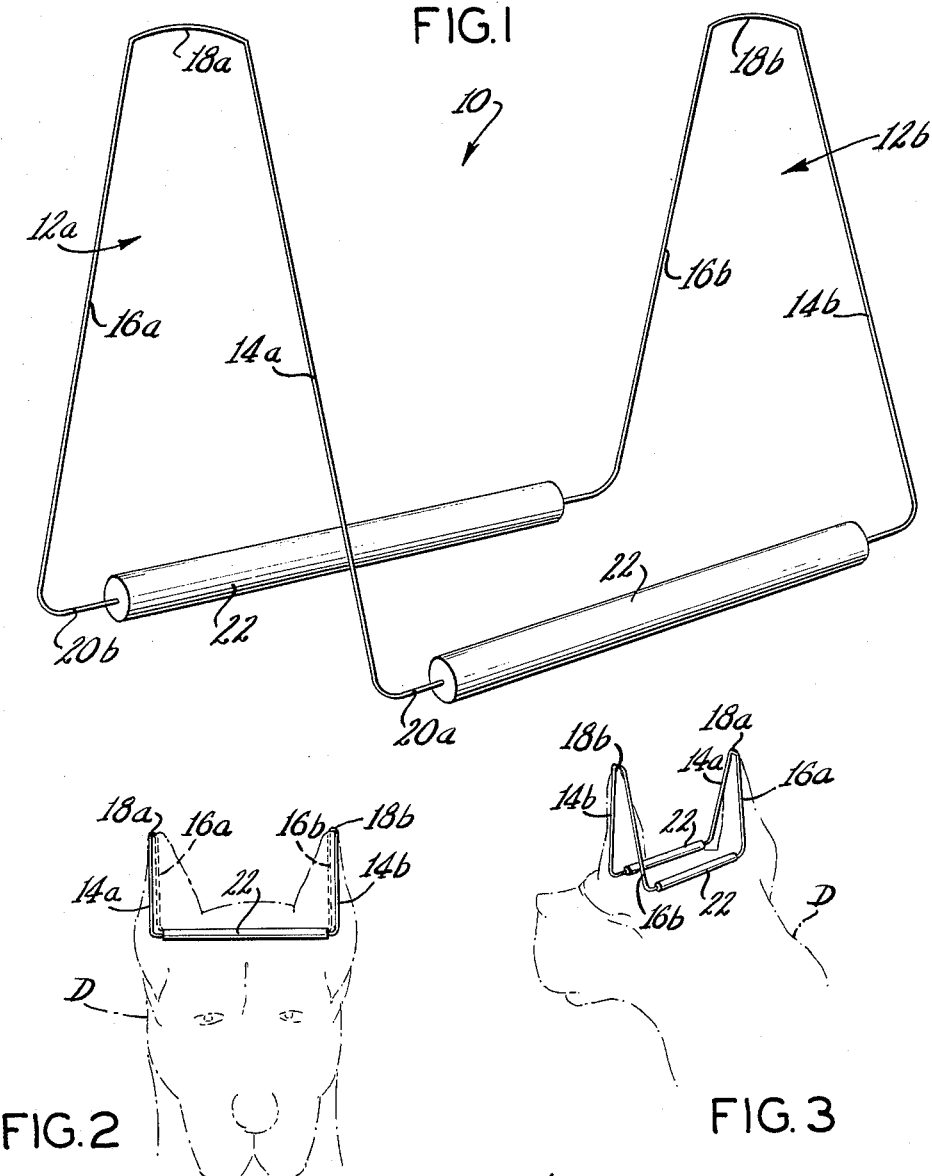
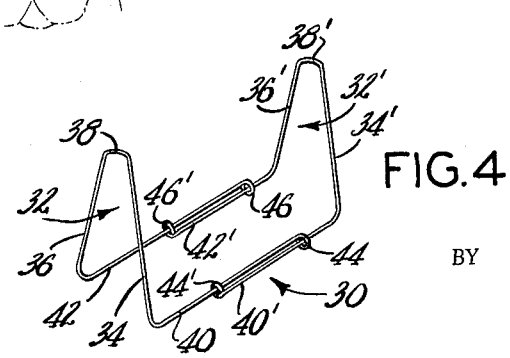
INVENTORS
FLORENCE ROBERTSON
CARMINE F. D'AMICO
BY
*Leonard H. King*
ATTORNEY.

United States Patent Office 3,257,990
Patented June 28, 1966

3,257,990
SUPPORT FOR NEWLY CROPPED EARS OF DOGS
Florence Robertson and Carmine F. D'Amico, both of 133–39 Hook Creek Blvd., Valley Stream, N.Y.
Filed Oct. 5, 1964, Ser. No. 401,473
3 Claims. (Cl. 119—96)

This invention relates generally to a post-operative device for a canine and more particularly to support means for the newly cropped ears of a dog.

For certain breeds of dogs, particularly boxers, Doberman pinschers, and certain terriers, one standard set by the American Kennel Club is that the dog's ears be cropped so that they stand erect when the dog is mature. Cropping is usually done when the dog is very young so that his ears may be properly trained. The operation is performed by a veterinarian who empirically decides the correct shape of the dog's ears.

While veterinarians are generally quite competent at the task of cropping, it follows that if the dog's ears are not properly trained, they will not stand erect regardless of the skillfulness of the cropping. At present, the most common form of training is to pack the dog's ears with cotton and then secure them together in an erect position by means of a tape bridge extending from ear to ear. In addition to being mildly discomforting to the dog, there is also a tendency for them to scratch at the cotton and tape. Other puppies in the same kennel will, in playing try to tear off the tape. The tape bridge joining the two ears also serves as a convenient grasp for older dogs to lift the young puppy. Thus, an expensive, pure bred dog having show potential can be permanently disfigured and eliminated from competition.

The present invention fills the voids of the prior art. A simple inexpensive retainer is positioned on top of the dog's head between his ears and taped thereto. No longer is it necessary to pack the ears with cotton. Instead of taping the ears together, each ear is taped to its own support which more closely approximates the ultimate position of the ears. The device is light in weight so there is very little desire for the dog to scratch at it.

Since the device rests on the dog's head and no raised bridge is provided, there is little structure for the other dogs to grasp. One embodiment of the present invention is a universal device that may readily be adjusted to fit a wide range of dog sizes.

Accordingly, it is an object of the present invention to provide improved apparatus for training a dog's ears after they have been cropped.

Another object is that the aforementioned apparatus be lightweight.

A further object of the present invention is that the apparatus is simple to use.

An additional object is that the apparatus be inexpensive to manufacture.

A still further object of the present invention is that the aforementioned apparatus is adjustable to fit various size dogs.

Another object is to provide means for training the cropped ears of a dog that does not cause discomfort to the dog.

An additional object is to provide an ear training device that is difficult for other dogs to grasp.

These and other features, objects and advantages of the invention will, in part, be pointed out with particularity and will, in part, become obvious from the following more detailed description of the invention, taken in conjunction with the accompanying drawing which forms an integral part thereof.

In the various figures of the drawing, like reference characters designate like parts.

In the drawing:
FIG. 1 is a pictorial elevation view of the present invention;
FIG. 2 is a front elevational view of the device shown in position on a dog's head;
FIG. 3 is a pictorial elevation view of the device as seen from the rear when it is positioned on a dog's head; and
FIG. 4 is a pictorial elevation view of an alternative embodiment of the present invention.

Referring now to the drawing, the retaining means shown in FIG. 1 is generally designated as 10. For the purposes of this description, reference characters with the subscript $a$ refer to components of invention on the left side as seen in FIG. 1 and reference characters with the subscript $b$ refer to components on the right side. In one embodiment of the invention, spaced, parallel ends 12a and 12b are both in the form of inverted U-shaped members and are comprised of converging leg portions 14a, 14b and 16a, 16b. Cross members 18a and 18b interconnect the more closely spaced ends of the legs. It should be understood, of course, that the aforementioned components are actually formed from a single length of rigid yet bendable wire even though for convenience it is described as being in several distinct pieces.

Front and rear parallel connecting members 20a and 20b, respectively, are horizontal and substantially at right angles to ends 12a and 12b. The connecting members join the widely spaced lower ends of the upstanding legs. That is, connecting member 20a extends between legs 14a and 14b while connecting member 20b extends between legs 16a and 16b. A protective, lightweight cushioning material 22 such as a soft fabric or plastic encases connecting members 20a and 20b so that the young dog is not made uncomfortable when the device is taped in place.

FIG. 2 and FIG. 3 show the device in place on a dog's head D which is shown in phantom outline. In this embodiment, the lateral spacing between ends 12a and 12b is made to conform to the dimensions of a particular breed of dog. The ears are securely held to upstanding ends 12a and 12b by means of an adhesively backed tape (not shown). There is no appreciable weight on the dog and his ears need not be packed to give them the desired shape. It should be observed that the cushioned connecting members are seated flush on the top of the dog's head thus making it very difficult, if not impossible, for another dog to pick the puppy up by the training device.

FIG. 4 illustrates an alternative embodiment of the present invention. All of the advantages and features of the first embodiment are also contained in this construction. Ear retainer 30 is adjustable and may be used on the smallest or largest dog. Ends 32 and 32' which are taped to the dog's ears are movable with respect to each other. It should be noted that in this embodiment the retainer 30 is formed from a wire covered with a suitable fabric or plastic to avoid causing the dog any discomfort. Polyurethane foam is preferred for this purpose.

End 32 is comprised of spaced upstanding legs 34 and 36 angled towards each other so that the tops thereof are closer to each other than the bottoms. Cross member 38 joins the two legs at the top. At their bottom ends, legs 34 and 36 are provided with horizontal extensions 40 and 42. The extensions are substantially at right angles to legs 34 and 36 and are additionally provided with loops 44 and 46, respectively, at the ends thereof.

End 32' is constructed in the same manner as end 32 so that the primed reference characters thereon denote the similar elements at the opposite end. It is convenient to assemble the device before the loops are completely closed. Thus loops 44 and 46 may be made to encircle extensions 40' and 42' while loops 44' and 46' encircle extensions 40 and 42.

Ear cropping requirements for certain breeds of dogs are established by the American Kennel Club for purposes of show standards. As pointed out in the "Complete Dog Book" on page 388, for example, the ears of a Doberman pinscher should have a particular configuration. If the dog's ears are not cropped because such an operation is prohibited by a local or state law, he will not be disqualified. However, the judge will consider it a fault and for all practical purposes such a dog is unlikely to attain champion status. Accordingly, his value for breeding purposes will be substantially reduced regardless of his other characteristics.

The relatively simple devices described hereinabove have utility in a field and in an application that has been devoid until now of any mechanical training means. The devices are easy to manufacture so that they may be sold at very low cost. The ear retainer and trainer causes no discomfort to the dog and in fact obviates the need to pack the dog's ears. By making the apparatus both lightweight and adjustable, a variety of breeds may use it to advantage.

There has been disclosed heretofore the best embodiment of the invention presently contemplated and it is to be understood that various changes and modifications may be made by those skilled in the art without departing from the spirit of the invention.

What is claimed is:

1. A training device adapted to be secured between the newly cropped ears of a dog to provide support therefor, said device comprising:
    (a) first and second end members each having a pair of spaced legs, said legs being connected to each other only at the top, said end members being spaced apart from each other in substantially parallel and upright planes; said end members being spaced apart a distance corresponding to the distance between the ears of a dog with which the device is to be used;
    (b) first and second elongated connecting members extending between said end members, said first connecting member joining the free end of one leg of said first end member to the free end of one leg of said second end member, said second connecting member joining the free end of the other leg of said first end member to the free end of the other leg of said second end member; and
    (c) a resilient, cushioning member encasing said first and second connecting members.

2. An adjustable training device adapted to be secured between the newly cropped ears of a dog to provide support therefor, said device comprising:
    (a) a first and second pair of end members each of which comprise:
        (1) a pair of legs joined to each other at their respective tops, said end members being spaced apart a distance corresponding to the distance between the ears of a dog with which the device is to be used;
        (2) an extension member integral with the bottom of each of said legs and extending substantially perpendicular to the plane of each of said pair of legs, and
        (3) a loop formed at the end of each extension;
    (b) the loops formed on said extension members of said first end member being slidably disposed about said extension members of said second end member and the loops formed on said extension members of said second end member being slidably disposed about said extension members of said first end members whereby said end members are adjustably positioned with respect to each other.

3. A training device adapted to be secured between the newly cropped ears of a dog to provide support therefor, said device comprising:
    (a) a pair of spaced apart frame members disposed, in the operative condition, in a substantially upright plane, said frame members being lengths of wire bent into an inverted, substantially U-shaped form; said frame members being spaced apart a distance corresponding to the distance between the ears of a dog with which the device is to be used, and
    (b) a pair of elongated connecting members extending between and joining said frame members.

References Cited by the Examiner

UNITED STATES PATENTS 2,587,966   3/1952   Cleary _____ 128—346

FOREIGN PATENTS 989   12/1910   Great Britain.

SAMUEL KOREN, *Primary Examiner.*

HUGH R. CHAMBLEE, *Examiner.*